United States Patent [19]
Takahashi

[11] Patent Number: 4,841,815
[45] Date of Patent: Jun. 27, 1989

[54] FUZZY CONTROL SYSTEM FOR AUTOMATIC TRANSMISSION

[75] Inventor: Hiroshi Takahashi, Tokyo, Japan

[73] Assignee: Nissan Motor Co., Ltd., Yokohama, Japan

[21] Appl. No.: 175,350

[22] Filed: Mar. 30, 1988

[30] Foreign Application Priority Data

Mar. 31, 1987 [JP] Japan .................................. 62-76004

[51] Int. Cl.⁴ ............................................. B60K 41/06
[52] U.S. Cl. ..................................... 74/866; 364/424.1
[58] Field of Search ................. 74/866, 865; 364/424.1

[56] References Cited

U.S. PATENT DOCUMENTS

| | | | |
|---|---|---|---|
| 4,262,335 | 4/1981 | Ahlen et al. | 74/866 X |
| 4,285,252 | 8/1981 | Yamaki et al. | 74/866 |
| 4,335,428 | 6/1982 | Miki et al. | 74/866 X |
| 4,353,272 | 10/1982 | Schneider et al. | 74/866 X |
| 4,361,060 | 11/1982 | Smyth | 74/866 |
| 4,380,048 | 4/1983 | Kishi et al. | 74/866 X |
| 4,393,467 | 7/1983 | Miki et al. | 74/866 X |
| 4,517,646 | 5/1985 | Magnusson et al. | 74/866 X |
| 4,630,508 | 12/1986 | Klatt | 74/866 |
| 4,713,764 | 12/1987 | Klatt | 74/866 X |
| 4,769,774 | 9/1988 | Narita et al. | 84/866 X |

Primary Examiner—Dwight G. Diehl
Attorney, Agent, or Firm—Foley & Lardner, Schwartz, Jeffery, Schwaab, Mack, Blumenthal & Evans

[57] ABSTRACT

A shift control system for an automatic transmission includes a sensing section for sensing various vehicle conditions, such as vehicle speed, acceleration, throttle opening, time rate of change of the throttle opening, and a vehicle running resistance, and fuzzy control section for determining a desired gear ratio by fuzzy inference using predetermined membership functions of the vehicle conditions.

8 Claims, 8 Drawing Sheets

FUZZY CONTROL SYSTEM FOR AUTOMATIC TRANSMISSION

BACKGROUND OF THE INVENTION

The present invention relates to a shift control system for an automatic transmission.

One conventional example of an electronic control system for an automatic transmission system employs sensors for, respectively, sensing vehicle speed and throttle opening and producing electric signals. In this conventional example, the transmission control system determines a transmission gear ratio corresponding to current values of the vehicle speed and throttle opening in accordance with one of predetermined shift patterns, which is selected by a manual operation of a driver of the vehicle or automatically.

However, this conventional control system is incapable of always providing a satisfactory control suitable to driver's intention because the gear ratio is determined simply by the vehicle speed and throttle opening, and there are, at most only about three different shift patterns available. In this conventional system, vehicle operating conditions other than the vehicle speed and throttle opening are not taken into account, and the shifting is restricted to few preset shift patterns. Therefore, the shift control of this system is inflexible. Furthermore, it requires much time and labor to design adequate shift patterns for many combinations of vehicles and engines.

SUMMARY OF THE INVENTION

It is an object of the present invention to provide an automatic transmission shift control system which can provide more flexible and adequate control performance.

According to the present invention, a shift control system for an automatic transmission for varying a transmission ratio, such as a gear ratio, in a stepwise or continuous manner, comprises vehicle condition detecting means and fuzzy control means. The condition detecting means comprises vehicle speed sensing means such as a vehicle speed sensor, and engine load sensing means such as a throttle position sensor, as shown in FIG. 1. The condition detecting means may further comprise acceleration sensing means, rate of engine load change sensing means and running resistance sensing means, as shown in FIG. 1. The fuzzy control means comprises membership function setting means and transmission ratio determining means (or gear ratio determining means) for determining the transmission ratio between an input rotational speed and an output rotational speed of the transmission. The membership function setting means sets a membership function of each vehicle condition for each of transmission positions (gear positions). For each transmission position, a fuzzy set is defined by the membership functions of the vehicle conditions. Each membership function is a characteristic function which determines membership of an object in the set, and assumes not only the value 1 for membership in the set and the value 0 for nonmembership but also any value between 0 and 1. The value of the membership function of each vehicle condition varies between 0 and 1 in accordance with that vehicle condition. The transmission ratio determining means is connected with the vehicle condition detecting means and the membership function setting means, and determines the transmission ratio from the vehicle speed, the engine load and the membership functions of the vehicle speed and engine load by fuzzy inference.

DETAILED DESCRIPTION OF THE INVENTION

Figure 1:
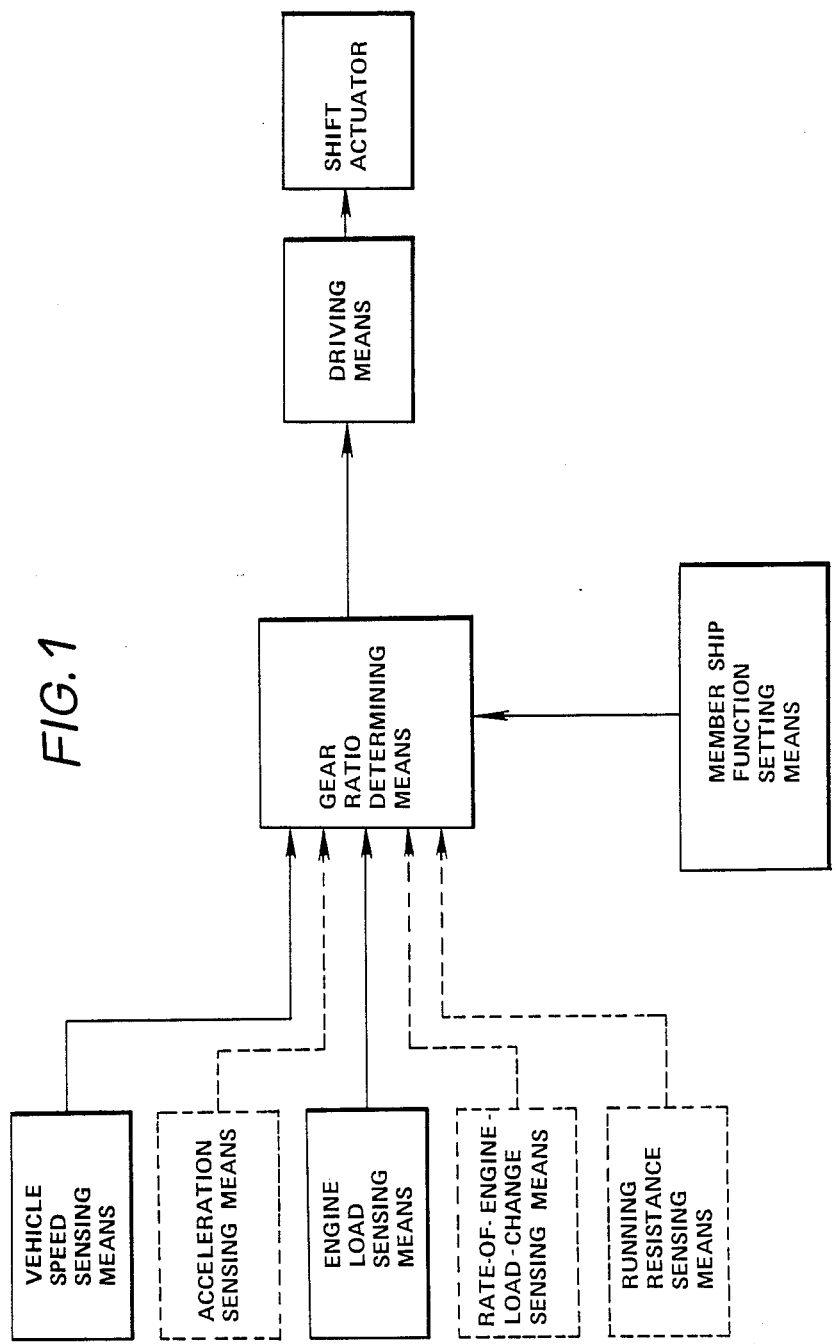
FIG. 1 is a block diagram showing a basic arrangement of the present invention.
Figure 2:
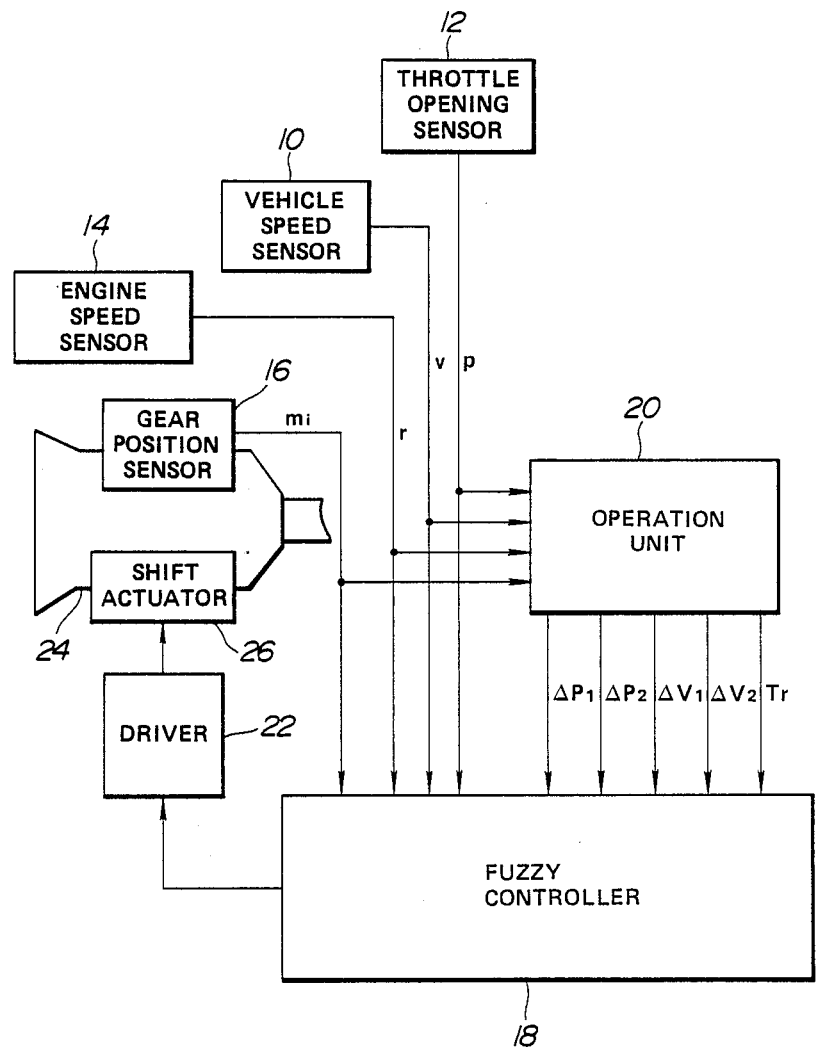
FIG. 2 is a schematic view showing a shift control system of one embodiment of the present invention.

One embodiment of the present invention is shown in FIG. 2.

In this embodiment, a shift control system for an automatic transmission of a vehicle includes a vehicle speed sensor 10 for sensing a speed V of the vehicle, a throttle opening sensor 12 for sensing a throttle opening (degree) P of an engine of the vehicle, an engine speed sensor 14 for sensing a rotational speed of the engine, and a transmission position sensor or gear position sensor 16 for sensing the condition of the transmission such as a gear ratio of the automatic transmission.

This control system further includes a fuzzy controller 18 and an operational unit 20. Output signals of the sensors 10, 12, 14 and 16 are inputted to both of the fuzzy controller 18 and the operational unit 20. By using these sensor output signals, the operational unit 20 calculates rates of change $\Delta V_1$ and $\Delta V_2$ of the vehicle speed V with respect to time, rates of change $\Delta P_1$ and $\Delta P_2$ of the throttle opening P with respect to time, and a running resistance Tr of the vehicle. The results of the calculations $\Delta V_1$, $\Delta V_2$, $\Delta P_1$, $\Delta P_2$ and Tr are inputted to the fuzzy controller 18.

By using the signals from the sensors, and operational unit 20, the fuzzy controller 18 determines a desired transmission position or transmission gear ratio by fuzzy inference, and produces a shift control signal. The shift control signal is sent through a driver 22 to a shift actuator 26 of the automatic transmission 24. The automatic transmission 24 of this embodiment is a type providing four forward speeds and having a torque converter equipped with a lockup clutch.

The operational unit 20 of this embodiment determines $\Delta V_1$, $\Delta V_2$, $\Delta P_1$, $\Delta P_2$ and Tr in the following manner. The rate of change $\Delta V_1$ of the vehicle speed is a difference between a current value of the vehicle speed, and an old value of the vehicle speed obtained 2 seconds before. Therefore, $\Delta V_1$ is substantially equal to the amount of change of V during a 2-second interval. The rate of change $\Delta V_2$ is a difference between the current value of the vehicle speed and an old value of the vehicle speed obtained 5 seconds before. The rate $\Delta V_2$ is substantially equal to the amount of change of V during a 5-second interval. The rate of change $\Delta P_1$ of the throttle opening is equal to the amount of change of the throttle opening during one basic clock period of a microcomputer (50 mS–100 mS). The rate $\Delta P_2$ is equal to the amount of change of the throttle opening during two basic clock periods.

Figure 3:
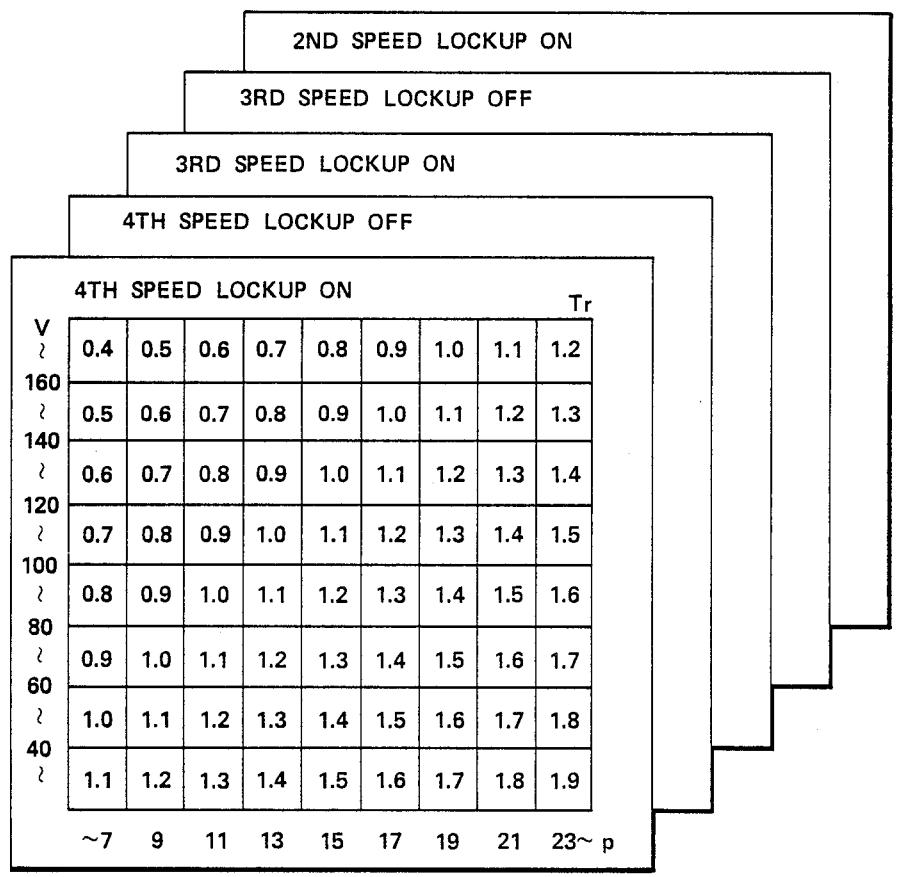
FIG. 3 is a view showing maps of index values of a vehicle's running resistance, used in the control system of FIG. 2.

In this embodiment, the operational unit 20 determines an index value of the running resistance Tr of the vehicle from the signals of the vehicle speed sensor 10, the throttle opening sensor 12 and the gear position sensor 16 by using data maps shown in FIG. 3. The running resistance is a sum of various components, such as rolling resistance, aerodynamic drag (air resistance) and climbing resistance. The maps of FIG. 3 are prepared in accordance with the gear position and the state of the lock-up clutch of the torque converter, which are sensed by the gear position sensor 16. The maps are stored in a storage device included in, or connected with, the operational unit 20. As shown in FIG. 3, there are two maps for each speed, one for the state in which the lockup clutch is engaged (lockup on) and one for the state in which the lockup clutch is disengaged (lockup off). Each map uniquely corresponds to one of the transmission positions. In each map, index values of the running resistance Tr are arranged in a rectangular array as a function of the vehicle speed V and the throttle opening P. The operational unit 20 selects one of the maps in accordance with the signal of the gear position sensor 16, and then retrieves a value of the running resistance Tr corresponding to the vehicle speed V sensed by the vehicle speed sensor 10 and the throttle opening P sensed by the throttle opening sensor 12.

When, for example, the vehicle speed is 100 km/h and the throttle opening is 13° in the lockup-on state of the fourth speed, then Tr=1.0. When the vehicle speed is 100 km/h and the throttle opening is 15° in the same state, it is possible to consider that the running resistance is increased by inclination of the road surface, increase in the number of passengers or some other reason, and accordingly the running resistance Tr becomes equal to 1.1. High values of Tr indicate that the running resistance is high. In this embodiment, Tr is designed to be 1.0 when the vehicle is running on a horizontal flat road with only one person under windless weather, and the value Tr=1.0 is treated as a standard running resistance value.

The fuzzy controller 18 receives the thus-determined $\Delta V_1$, $\Delta V_2$, $\Delta P_1$, $\Delta P_2$ and Tr from the operational unit 20. The fuzzy controller 18 further receives a vehicle speed signal v of the vehicle speed sensor 10, a throttle opening signal p of the throttle opening sensor 12, an engine rpm signal r of the engine rotational speed sensor 14, and a gear position signal mi of the gear position sensor 16. By using these input signals, the fuzzy controller 18 determines the best gear position by fuzzy inference in the following manner.

Figure 4:
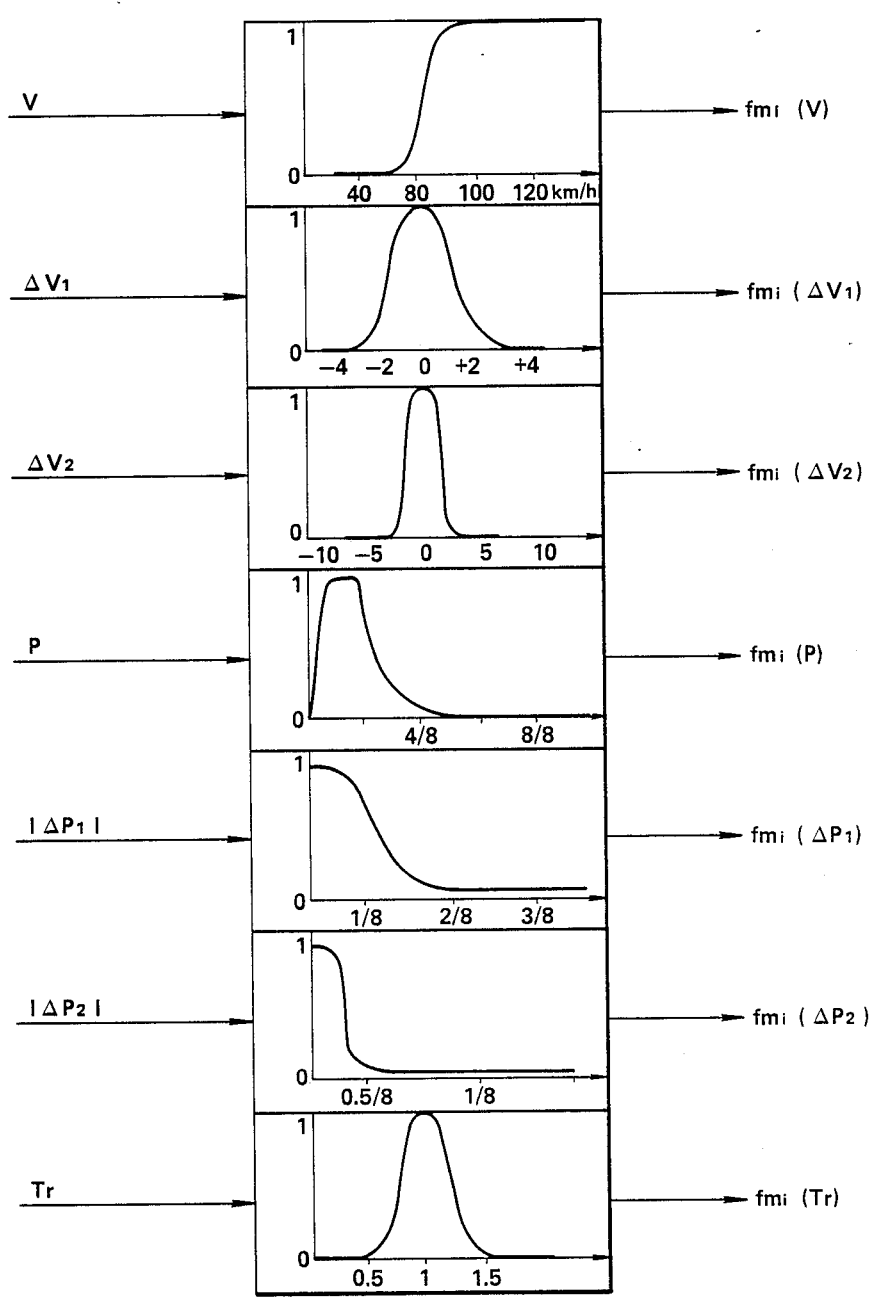
FIG. 4 is a view showing membership functions for one transmission position.
Figure 5:
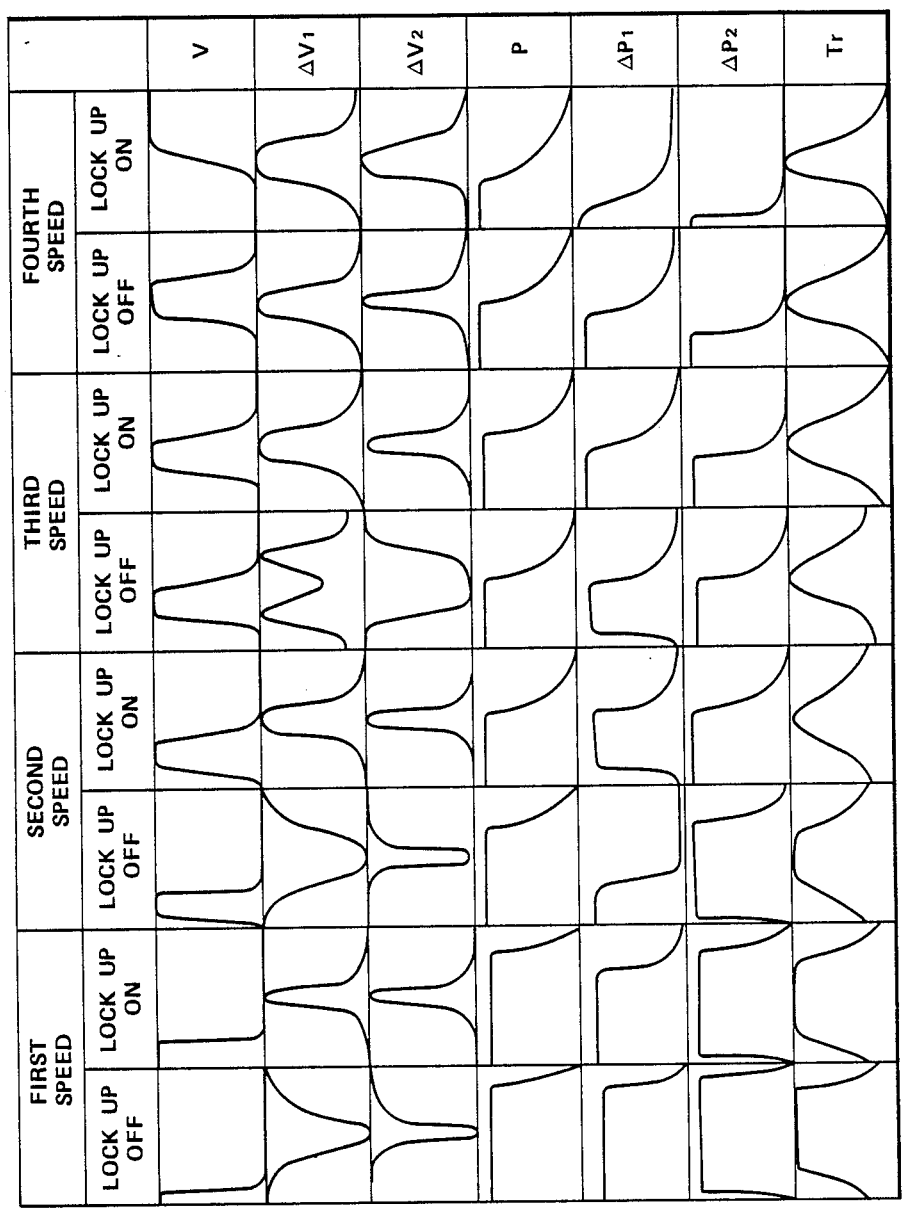
FIG. 5 is a view for concretely showing 56 membership functions for 8 transmission positions, which are used in the control system of FIG. 2.

The fuzzy controller 18 makes an estimation to determine the desired gear position in accordance with predetermined membership functions of a fuzzy set for each transmission (gear) position mi. For each transmission position mi, there are prepared membership functions with respect to V, $\Delta V_1$, $\Delta V_2$, P, $\Delta P_1$, $\Delta P_2$, and Tr, as shown in FIG. 4. For example, the membership function relative to the vehicle speed V is shown in the uppermost graph of FIG. 4, whose axis of abscissa expresses the vehicle speed, and whose axis of ordinate expresses the degree of fuzziness (, or the degree of definiteness) of the transmission position mi. The degree of fuzziness is expressed by any value between b 0 and 1. The value 0 means that the choice of the transmission position mi is not possible, and the value 1 means that the choice of the transmission position mi is sure. The possibility of the transmission position mi increases as the membership function increases from 0 to 1. The membership functions relative to $\Delta V_1$, $\Delta V_2$, P, $\Delta P_1$, $\Delta P_2$ and Tr are prepared in the same manner. In this way, there are prepared seven membership functions of V, $\Delta V_1$, $\Delta V_2$, P, $\Delta P_1$, $\Delta P_2$ and Tr for each of the eight transmission positions, i.e. the first speed lockup off state, the first speed lockup on state, the second speed lockup off state, ... the fourth speed lockup on state, as shown in FIG. 5. Each membership function is a function of the vehicle condition V, $\Delta V_1$, $\Delta V_2$, P, $\Delta P_1$, $\Delta P_2$ or Tr, and varies continuously between 0 and 1 in accordance with the vehicle condition.

Figure 6:
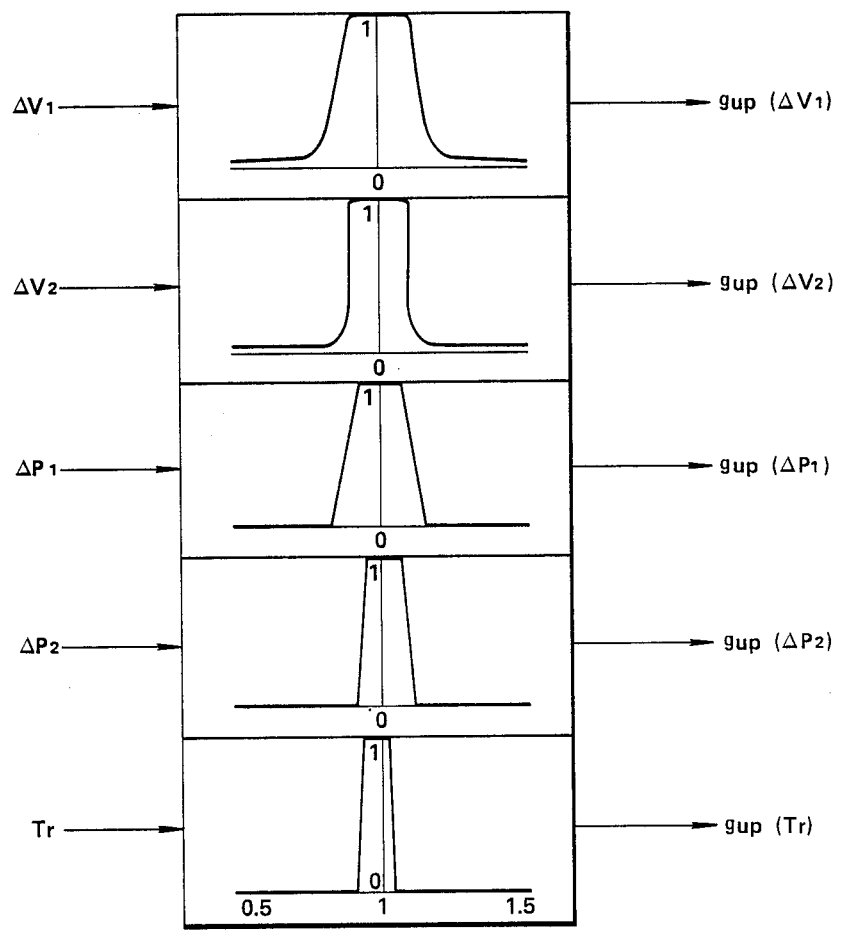
FIG. 6 is a view for showing membership functions for upshift, used in the control system of FIG. 2.
Figure 7:
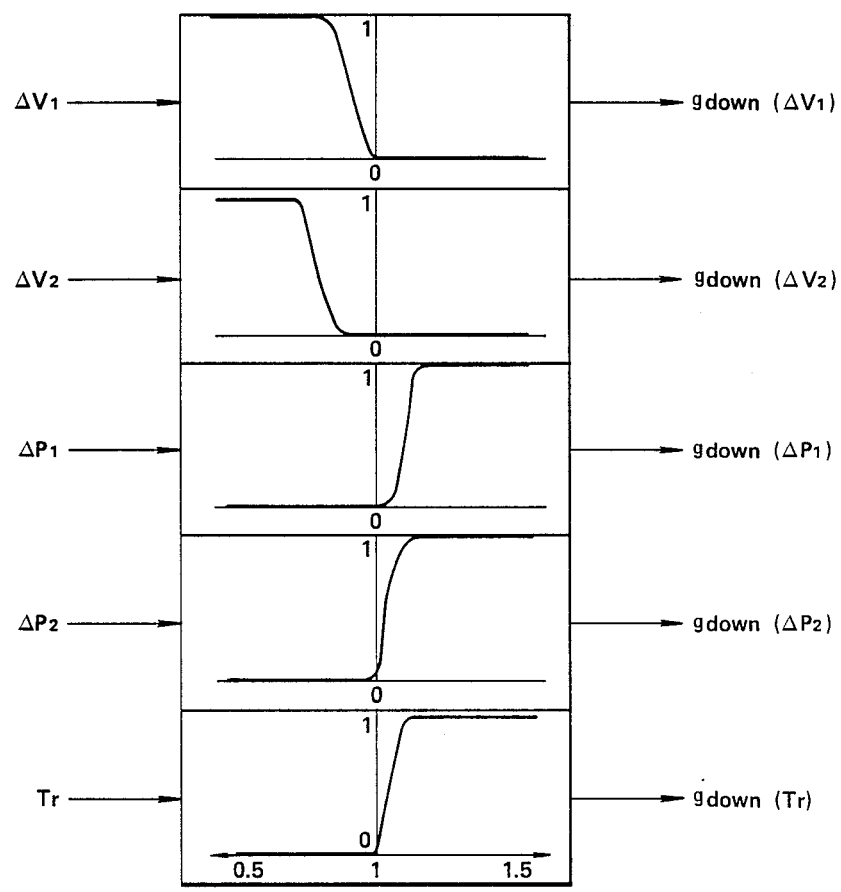
FIG. 7 is a view for showing membership functions for downshift, used in the control system of FIG. 2.

The fuzzy controller 18 further uses membership functions for shifting up, as shown in FIG. 6, and membership functions for shifting down. In each membership function of FIGS. 6 and 7, the ordinate expresses the degree of fuzziness, and the abscissa expresses $\Delta V_1$, $\Delta V_2$, $\Delta P_1$, $\Delta P_2$ or Tr. As $\Delta P_1$ and $\Delta P_2$ increase, for example, the degree of fuzziness of the downshift decreases (or the degree of definiteness increases), as shown in FIG. 7.

By using these membership functions shown in FIGS. 5, 6 and 7, the fuzzy controller 18 controls the shifting of the automatic transmission 24 in the following manner.

The degrees of fuzziness obtained by the membership functions shown in FIG. 5 are expressed by fmi(j), where j is any whole number from 1 to 7. The values of j denotes the following signals.

j=1 ... V
j=2 ... $\Delta V_1$
j=3 ... $\Delta V_2$
j=4 ... P
j=5 ... $\Delta P_1$
j=6 ... $\Delta P_2$
j=7 ... Tr Similarly, the degrees of fuzziness of the upshift and downshift are expressed by $g_{up}(j)$ and $g_{down}(j)$.

For each transmission position mi, the overall degree of fuzziness with respect to a combination of all the input signals is given by:

$$F(mi) = \Sigma fmi(j)/7$$

Alternatively, it is optional to employ the following equation including weights aj where j=1,2,3 ... or 7.

$$F(mi) = \Sigma aj \cdot fmi(j)/\Sigma aj$$

Similarly, the overall degrees of fuzziness of the upshift and downshift are given by:

$$G_{up} = \Sigma g_{up}(j)/5$$

$$G_{down} = \Sigma g_{down}(j)/5$$

The thus-determined overall degree F(mi) represents the degree of fuzziness of a given transmission position mi, that is, the degree of adequacy of the given transmission position. The overall degrees $G_{up}$ and $G_{down}$ represent, respectively, the degrees of fuzziness of the upshift and downshift, that is, the degrees of adequacy of the upshift and downshift.

The fuzzy controller 18 determines whether to command shifting or not, by using the following evaluation function S.

$$S = \frac{F(min) \cdot mi + G_{up} \cdot F(mi+1) - G_{down} \cdot F(mi-1)}{F(mi) \cdot mi}$$

Figure 8:
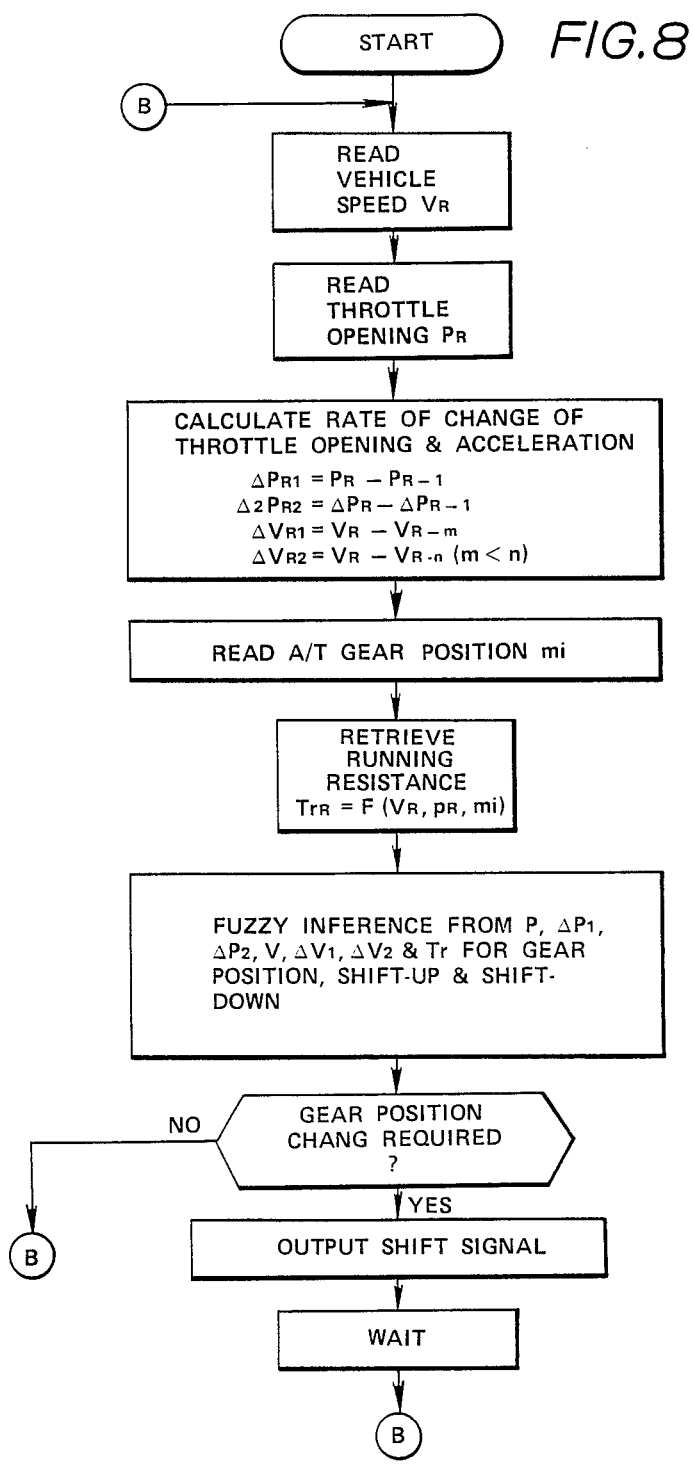
FIG. 8 is a flowchart showing a control process of the control system of FIG. 2.

(If there is no transmission position corresponding to mi+1 or ni−1, then F(mi+1) or F(mi−1) of the nonexisting transmission position is zero.) The fuzzy controller 18 produces the shift control signal to command the shift actuator 26, and controls the transmission 24 in the following manner. The fuzzy controller 18 holds the current transmission position mi unchanged if the evaluation function S is equal to 1, commands an upshift if the evaluation function S is equal to or greater than a predetermined value greater than 1 and there exists a gear position higher than the current gear position and commands a downshift if the evaluation function S is equal to or smaller than a predetermined value smaller than 1, and there exists a gear position lower than the current gear position. FIG. 8 is a flowchart showing one example of a program performed by the control system of this embodiment.

In this way, the gear position of the transmission is determined by fuzzy inference in accordance with V, $\Delta V_1$, $\Delta V_2$, P, $\Delta P_1$, $\Delta P_2$ and Tr. Therefore, this control system can always select the gear ratio suitable to the driver's demand in accordance with operating conditions of the vehicle, as compared with a conventional control system in which shift patterns (schedules) are determined only by the vehicle speed and throttle opening. Furthermore, each of the signals representing the operating conditions of the vehicle is treated not in an inflexible manner as in an on-off control or other simple controls based only on a judgement of whether the signal is greater than (or smaller) than a predetermined value, but in a more flexible and comprehensive manner which allows fuzziness. Therefore, the selection of the gear ratio made by the control system of the present invention is closer to the actual judgement of a driver. Furthermore, the present invention can reduce labor in designing transmission shift patterns because the membership functions once prepared can be used widely for different vehicles and engines.

The present invention is applicable also to continuously variable transmissions substantially in the same manner.

What is claimed is:

1. A shift control system for a vehicular automatic transmission having different transmission positions, comprising:
   vehicle condition detecting means comprising a vehicle speed sensor for sensing vehicle speed of a vehicle, and an engine load sensor for sensing engine load of an engine of the vehicle, and
   fuzzy control means comprising setting means for setting, for each transmission position, a membership function of said vehicle speed and a membership function of said engine load for defining a fuzzy set, and determining means for determining a transmission ratio from said vehicle speed, said engine load and said membership functions by fuzzy inference, and producing a shift control signal for controlling shifting of the transmission,
   wherein said condition detecting means further comprises acceleration sensing means for sensing an acceleration of the vehicle, rate of engine load change sensing means for sensing a rate of change of said engine load, and running resistance sensing means for sensing a running resistance of the vehicle, and wherein said setting means of said fuzzy control means further sets a membership function of said acceleration, a membership function of said rate of engine load change and a membership function of said running resistance, and said determining means further uses said acceleration, said rate of engine load change, said running resistance, and said membership functions of said acceleration, said rate of engine load change and said running resistance for determining said transmission ratio.

2. A shift control system according to claim 1 wherein said condition detecting means further comprises a transmission position sensor for sensing said transmission positions, and said running resistance sensing means are connected with said vehicle speed sensor, said engine load sensor and said transmission position sensor, for determining a value of said running resistance corresponding to said vehicle speed and said engine load is accordance with one of predetermined relationships which is selected in accordance with said transmission position.

3. A shift control system according to claim 2 wherein said determining means of said fuzzy control means comprises means for determining an evaluation function which is a function of said membership functions.

4. A shift control system according to claim 3 wherein said setting means further sets a membership function of said acceleration for upshift, a membership function of said rate of engine load change for upshift, a membership function of said running resistance for upshift, a membership function of said acceleration for downshift, a membership function of said rate of engine load change for downshift, and a membership function of said running resistance for downshift, and said determining means determines said transmission ratio by using said evaluation function which is a function of all of said membership function.

5. A shift control system according to claim 4 wherein said determining means comprises means for determining an overall degree of fuzziness for each transmission position which is an average of values of said membership functions of said vehicle speed, said acceleration, said engine load, said rate of engine load change, and said running resistance for each transmission position, means for determining an overall degree of fuzziness for upshift which is an average of values of said membership functions of said acceleation, said rate of engine load change and said running resistance for upshift, and means for determining an overall degree of fuzziness for downshift which is an average of said membership function of said acceleration, said rate of engine load change and said running resistance for downshift, and wherein said evaluation function is a function of said overall degree of fuzziness for said gear position currently sensed by said transmission position sensor, and said overall degrees of fuzziness for upshift and downshift.

6. A shift control system according to claim 5 wherein said averages are weighted averages.

7. A shift control system according to claim 6 wherein said engine load sensor is a throttle opening sensor for sensing an opening degree of a throttle valve of the engine, and said engine load is said opening degree of the throttle valve.

8. A shift control system according to claim 7 wherein said acceleration sensing means is connected with said vehicle speed sensor, and determines a first amount of change of said vehicle speed during a first time interval, and a second amount of change of said vehicle speed during a second time interval which is longer than said first time interval, and said rate of engine load change sensing means is connected with said engine load sensor, and determines a first amount of change of said engine load during a third time interval, and a second amount of change of said engine load during a fourth time interval which is longer than said third time interval, and wherein said membership function of said acceleration for each transmission position comprises a membership function of said first amount of change of said vehicle speed and a membership function of said second amount of change of said vehicle speed, and said membership function of said rate of engine load change for each transmission position comprises a membership function of said first amount of change of said engine load and a membership function of said second amount of said engine load.

* * * * *